United States Patent
Schumacher et al.

(10) Patent No.: US 9,781,015 B2
(45) Date of Patent: *Oct. 3, 2017

(54) MAKING MEMORY OF COMPUTE AND EXPANSION DEVICES AVAILABLE FOR USE BY AN OPERATING SYSTEM

(71) Applicant: Hewlett-Packard Development Company, L.P., Houston, TX (US)

(72) Inventors: Derek Schumacher, Auburn, CA (US); Sylvia K Myer, Fort Collins, CO (US); Russ W Herrell, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/781,014

(22) PCT Filed: Mar. 28, 2013

(86) PCT No.: PCT/US2013/034202
§ 371 (c)(1),
(2) Date: Sep. 28, 2015

(87) PCT Pub. No.: WO2014/158152
PCT Pub. Date: Oct. 2, 2014

(65) Prior Publication Data
US 2016/0043912 A1 Feb. 11, 2016

(51) Int. Cl.
*G06F 9/455* (2006.01)
*G06F 9/46* (2006.01)
(Continued)

(52) U.S. Cl.
CPC ............ *H04L 41/5054* (2013.01); *G06F 3/06* (2013.01); *G06F 9/455* (2013.01);
(Continued)

(58) Field of Classification Search
None
See application file for complete search history.

(56) References Cited

U.S. PATENT DOCUMENTS 6,094,699 A  7/2000 Surugucchi
6,199,107 B1 3/2001 Dujari
(Continued)

FOREIGN PATENT DOCUMENTS

CN     1655519 A     8/2005
CN     101371224     2/2009
(Continued)

OTHER PUBLICATIONS

Lim et al, "Disaggregated Memory for Expansions and Sharing in Blade Servers", ISCA'09, Jun. 2009, ACM, pp. 1-12.*
(Continued)

*Primary Examiner* — Charles Swift
(74) *Attorney, Agent, or Firm* — Hewlett Packard Enterprise Patent Department (57) ABSTRACT

Examples disclosed herein relate to making memory of compute and expansion blade devices available for use by an operating system (OS). Examples include making available, for use by an OS, a compute logical processor of the compute blade device, identified memory of the compute blade device, and identified memory of an expansion blade device. Examples further include making the expansion logical processor unavailable to the OS.

17 Claims, 4 Drawing Sheets

(51) Int. Cl.
*G06F 15/173* (2006.01)
*H04L 12/24* (2006.01)
*G06F 9/50* (2006.01)
*G06F 3/06* (2006.01)
*G06F 11/07* (2006.01)
*H04L 29/08* (2006.01)

(52) U.S. Cl.
CPC ...... *G06F 9/45533* (2013.01); *G06F 9/45558* (2013.01); *G06F 9/50* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5061* (2013.01); *G06F 9/5066* (2013.01); *G06F 9/5072* (2013.01); *G06F 9/5077* (2013.01); *G06F 11/0709* (2013.01); *G06F 11/0751* (2013.01); *G06F 11/0772* (2013.01); *H04L 67/16* (2013.01); *G06F 2009/45579* (2013.01); *G06F 2009/45583* (2013.01)

(56) References Cited

U.S. PATENT DOCUMENTS

| | | |
|---|---|---|
| 6,279,085 B1 | 8/2001 | Carpenter et al. |
| 6,418,525 B1 | 7/2002 | Charney |
| 6,453,344 B1 | 9/2002 | Ellsworth et al. |
| 6,684,343 B1 | 1/2004 | Boucier et al. |
| 6,988,169 B2 | 1/2006 | Burger et al. |
| 7,064,376 B2 | 6/2006 | Shau |
| 7,096,469 B1 | 8/2006 | Kubala et al. |
| 7,222,339 B2 | 5/2007 | Rothman et al. |
| 7,383,461 B2 | 6/2008 | Buckler et al. |
| 7,474,623 B2 | 1/2009 | Boyd et al. |
| 7,480,747 B2 | 1/2009 | Bell et al. |
| 7,603,516 B2 | 10/2009 | Allen |
| 7,694,298 B2 | 4/2010 | Goud et al. |
| 7,752,495 B2 | 7/2010 | Zorek, Sr. et al. |
| 7,814,366 B2 | 10/2010 | Apparao et al. |
| 7,921,179 B1 | 4/2011 | Zheng et al. |
| 8,090,932 B1 | 1/2012 | Kwan |
| 8,140,871 B2 | 3/2012 | Abdul et al. |
| 8,151,147 B2 | 4/2012 | Rajkumari et al. |
| 8,180,996 B2 | 5/2012 | Fullerton et al. |
| 8,230,145 B2 | 7/2012 | Bresniker |
| 8,788,750 B2 | 7/2014 | Jacobson et al. |
| 2001/0013089 A1 | 8/2001 | Weber |
| 2002/0052914 A1* | 5/2002 | Zalewski .............. G06F 9/5077 709/203 |
| 2002/0099886 A1 | 7/2002 | Emerson et al. |
| 2004/0024831 A1 | 2/2004 | Yang et al. |
| 2004/0139368 A1 | 7/2004 | Austen et al. |
| 2004/0186688 A1 | 9/2004 | Nejedlo |
| 2004/0255286 A1 | 12/2004 | Rothman |
| 2005/0015430 A1 | 1/2005 | Rothman et al. |
| 2005/0021847 A1 | 1/2005 | Rothman et al. |
| 2005/0060531 A1 | 3/2005 | Davis et al. |
| 2005/0172164 A1 | 8/2005 | Fox et al. |
| 2005/0257213 A1 | 11/2005 | Chu et al. |
| 2006/0004942 A1 | 1/2006 | Hetherington et al. |
| 2006/0010352 A1 | 1/2006 | Mukherjee et al. |
| 2006/0036889 A1 | 2/2006 | Arai |
| 2006/0265567 A1* | 11/2006 | Ji ........................ G06F 3/0605 711/173 |
| 2007/0067318 A1 | 3/2007 | Wolafka et al. |
| 2007/0067432 A1 | 3/2007 | Tarui et al. |
| 2007/0067614 A1 | 3/2007 | Berry et al. |
| 2007/0150713 A1 | 6/2007 | Almeida et al. |
| 2007/0174553 A1 | 7/2007 | Morrow et al. |
| 2007/0245423 A1 | 10/2007 | Herington |
| 2008/0183626 A1 | 7/2008 | Romero et al. |
| 2008/0229049 A1 | 9/2008 | Nanda et al. |
| 2008/0229146 A1 | 9/2008 | Arai |
| 2009/0006710 A1* | 1/2009 | Daniel ................. G06F 9/45558 710/315 |
| 2009/0007120 A1 | 1/2009 | Fenger et al. |
| 2009/0037657 A1* | 2/2009 | Bresniker .......... G06F 13/1694 711/115 |
| 2009/0119748 A1 | 5/2009 | Yao |
| 2009/0144579 A1 | 6/2009 | Swanson |
| 2009/0171511 A1 | 7/2009 | Tolentino |
| 2009/0172228 A1 | 7/2009 | Zimmer |
| 2009/0172232 A1 | 7/2009 | Zimmer |
| 2009/0183016 A1 | 7/2009 | Chan |
| 2009/0313390 A1* | 12/2009 | Ahuja .................. G06F 13/409 710/2 |
| 2010/0165874 A1 | 7/2010 | Brown et al. |
| 2010/0186018 A1* | 7/2010 | Bell, Jr. ................ G06F 9/5088 718/104 |
| 2011/0029652 A1* | 2/2011 | Chhuor ............... G06F 9/45541 709/223 |
| 2011/0093574 A1* | 4/2011 | Koehler ............... G06F 15/161 709/222 |
| 2011/0113115 A1* | 5/2011 | Chang ................. G06F 15/7803 709/213 |
| 2011/0138219 A1 | 6/2011 | Walton et al. |
| 2011/0145411 A1 | 6/2011 | Ford et al. |
| 2011/0145657 A1 | 6/2011 | Bishop et al. |
| 2012/0017077 A1* | 1/2012 | Darling ................ G06F 9/5077 713/100 |
| 2012/0047312 A1* | 2/2012 | Nathuji ................ G06F 9/3832 711/6 |
| 2012/0102273 A1* | 4/2012 | Chang ................. G06F 12/0815 711/143 |
| 2012/0110154 A1* | 5/2012 | Adlung ................ G06F 9/5077 709/223 |
| 2012/0110588 A1* | 5/2012 | Bieswanger .............. G06F 8/65 718/104 |
| 2012/0210042 A1* | 8/2012 | Lim ..................... G06F 12/0223 711/6 |
| 2012/0278566 A1* | 11/2012 | Gilson ................... G06F 12/00 711/159 |
| 2013/0007310 A1 | 1/2013 | Inagaki |
| 2013/0073811 A1 | 3/2013 | Beckmann et al. |
| 2013/0275703 A1* | 10/2013 | Schenfeld .......... G06F 12/0292 711/165 |
| 2015/0052293 A1 | 2/2015 | Gaither et al. |

FOREIGN PATENT DOCUMENTS

| | | |
|---|---|---|
| EP | 0636973 | 2/1995 |
| EP | 2239662 A2 | 10/2010 |
| JP | 2007-172591 | 7/2007 |
| JP | 2007526527 | 9/2007 |
| JP | 2010-250817 | 11/2010 |
| TW | I231424 | 4/2005 |
| TW | 200608188 | 3/2006 |
| TW | 200723089 | 6/2007 |
| TW | 201025025 A | 7/2010 |
| WO | WO-2006004875 A1 | 1/2006 |
| WO | WO-2009154626 A1 | 12/2009 |
| WO | WO-2011071498 | 6/2011 |
| WO | WO-2013126056 | 8/2013 |

OTHER PUBLICATIONS

Frey et al, "IBM Unified Resource Manager Introduction and Overview", Jan./Mar. 2012, IBM, pp. 1-10.*
Mayer at al, "Unified Resource Manager Virtualization Management", Jan./Mar. 2012, IBM, pp. 1-9.*
Brey, "BladeCenter chassis management," Nov. 2005, IBM J. Res. & Dev. vol. 49, No. 6, <http://citeseerx.ist.psu.edu/viewdoc/download?doi=10.1.1.87.8078&rep=rep1&type=pdf.
Cisco Unified Computing System: Architecture for Implementing the Next Phase in an Industry Transition; http://www.cisco.com/en/US/prod/collateral/ps10265/ps10281/solution_overview_c22-522771.pdf> Nov. 2012.
Cisco; Achieve Automated; End-to-end Firmware Management with Cisco UCS Manager; http://www.cisco.com/en/US/solutions/collateral/ns340/ns517/ns224/ns944/white_paper_c11-588010_ps10280_Products_White_Paper.html >, Nov. 28, 2012.

(56) References Cited

OTHER PUBLICATIONS

Deployment Guide: Deploying 8Gb/s Fibre Channel with HP Bladesystem and VMware VSphere; http://book5.org/d/deployment-guide-deploying-80gb-s-fibre-channel-with-hp-w738-pdf.pdf>, Jun. 2016.

Gostin, Gary, "The Architecture of the HP Superdome Shared-Memory Multiprocessor," ICS '05 proceedings of the 19th annual international conference on supercomputing, ACM, pp. 229-245, 2005. See Chapters 4 and 5.

IBM; Expansion Blades; http://www-03.ibm.com/systems/bladecenter/hardware/expansion/memory.html > ; Nov. 28, 2012.

IBM; IBM BladeCenter HX5; http://www-03.ibm.com/systems/bladecenter/hardware/servers/hx5/features.html >; Nov. 28, 2012.

International Searching Authority, International Search Report & Written Opinion, issued in PCT/US2013/034202, Dec. 2, 2013, 10 pages.

International Searching Authority, International Search Report & Written Opinion, issued in PCT/US2013/034236, Dec. 24, 2013, 9 pages.

International Searching Authority, International Search Report & Written Opinion, issued in PCT/US2013/034277, Dec. 27, 2013, 9 pages.

SGI® Altix® UV Systems Linux® Configuration and Operations Guide; http://techpubs.sgi.com/library/manuals/5000/007-5629-003/pdf/007-5629-003.pdf >; Jun. 2010.

Sun Blade 6000 Modular Systems From Oracle®; http://www.oracle.com/us/products/servers-storage/servers/blades/sun-blade-6000-modular-systems-wp-102376.pdf >; Jun. 2010.

"Advanced Configuration and Power Interface—Wikipedia, the free encyclopedia",Aug. 2011 (Aug. 1, 2011), XP055241714, Retrieved from the Internet: URL:https://en.wikipedia.Org/w/index.php7title=Advanced_Configuration_and_Power_Interface &oldid= 442525513 [retrieved on Jan. 15, 2016] *p. 4 *.

"UEFI vol. 2: Platform Intiitalziation Specification—Driver Execution Environment Core Interface",, Oct. 27, 2011 (Oct. 27, 2011), XP055215931, 218 pages.

"UEFI vol. 4: Platform Initialization Specification—System Management Mode Core Interface",, Oct. 27, 2011 (Oct. 27, 2011), XP055215959, 292 pages.

Andrew S. Tanenbaum, "Introduction," Structured Computer Organization, Ch. 1 (excerpt), 1984, Prentice-Hall Inc., Second Edition, pp. 10-12.

Anonymous: "System Management Mode—Wikipedia, the free encycloped",, Aug. 8, 2011 (Aug. 8, 2011), XP055215778, 4 pages.

EPO, Communication pursuant to Article 94(3) EPC, mailed Feb. 7, 2017, issued in EP App No. 12869523.6, 12 pages.

EPO, Extended Supplementary Search Report, mailed Oct. 13, 2015, EP App No. 12869523.6, 12 pps.

European Patent Office, Extended European Search Report, dated Dec. 2, 2016, issued in EP application No. 13880256.6, 12 pages.

European Patent Office, Extended European Search Report, dated Oct. 20, 2016, issued in EP application No. 13880294.7, 11 pages.

International Search Report & Written Opinion, dated Dec. 27, 2012, issued in International Patent App No. PCT/US2012/035761, 10 pages.

ISA/KR, International Search Report, mailed Feb. 28, 2013, PCT/US2012/026128 filed Feb. 22, 2012, 9 pages.

Loic Duflot, "Using CPU System Management Mode to Circumvent Operating System Security Functions", Cansecwest 2009, 15 pages.

USPTO, Final Office Action issued Jul. 11, 2016, in U.S. Appl. No. 14/387,598 (filing date Apr 30, 2012).

USPTO, Final Office Action issued Nov. 30, 2016, in U.S. Appl. No. 14/378,971 (filing date Feb. 22, 2012).

USPTO, Non-final Office Action issued Apr. 19, 2016, in U.S. Appl. No. 14/387,598 (filing date Apr. 30, 2012).

USPTO, Non-Final Office Action issued Mar. 25, 2016, in U.S. Appl. No. 14/378,971 (filing date Feb. 22, 2012).

* cited by examiner

MAKING MEMORY OF COMPUTE AND EXPANSION DEVICES AVAILABLE FOR USE BY AN OPERATING SYSTEM

BACKGROUND

A blade system may include a plurality of blade devices mounted in a blade enclosure. Each of the blade devices may be a blade server, for example. In some examples, a user may set up a partition of the blade system to include one, several, or all of the blade devices mounted in the blade enclosure. In such examples, the partition may run an operating system (OS) and run application(s) with the OS.

BRIEF DESCRIPTION OF THE DRAWINGS

The following detailed description references the drawings, wherein.

DETAILED DESCRIPTION

As noted above, a partition of a blade system may run an operating system (OS) and run application(s) with the OS. The partition that runs the OS may include multiple blade devices, each including logical processor(s) and memory. Each logical processor may be included on an integrated circuit (IC) (e.g., a chip). An IC including at least one central processing unit (CPU) may be referred to herein as a "CPU IC". In some examples, in addition to logical processor(s), a CPU IC may include at least one integrated memory controller to manage memory of the blade device. In such examples, a memory controller of a CPU IC may be able to manage a relatively limited amount of memory, which may limit the amount of memory available on a blade device, and thus in a partition.

More memory may be added to a partition by adding additional blade device(s) to the partition. However, license costs for some applications run by the OS may be calculated based on the number logical processors available for the application to utilize. As such, adding blade devices to a partition may substantially increase license costs for some applications due to the availability of the logical processors of the added blade devices.

To address these issues, examples described herein may configure a compute logical processor of a compute blade device and an expansion logical processor of an expansion blade device to operate as part of a single SFW domain, and identify available memory of the compute blade device and available memory of the expansion blade device. Examples described herein may further make the compute logical processor and the identified memory of the compute and expansion blade devices available for use by an OS, and make the expansion logical processor unavailable to the OS while the expansion logical processor remains available to execute instructions of the SFW instance.

In this manner, examples described herein may enable a partition of a blade system to utilize memory of an expansion blade device without exposing logical processor(s) of the expansion blade device (i.e., expansion logical processor(s)) to the OS run by the partition or the applications run by the OS. As such, examples described herein may enable a partition to use the memory of an expansion blade device for running an OS and application(s), without the expansion logical processor(s) of the expansion blade device increasing application license costs. Additionally, by remaining available to execute instructions of the SFW instance, an expansion logical processor made unavailable to the OS may remain available to collect error information at the expansion blade device, or otherwise manage resources of the expansion blade device under the control of instructions of the SFW instance, while still being unavailable for use by the OS.

Figure 1:
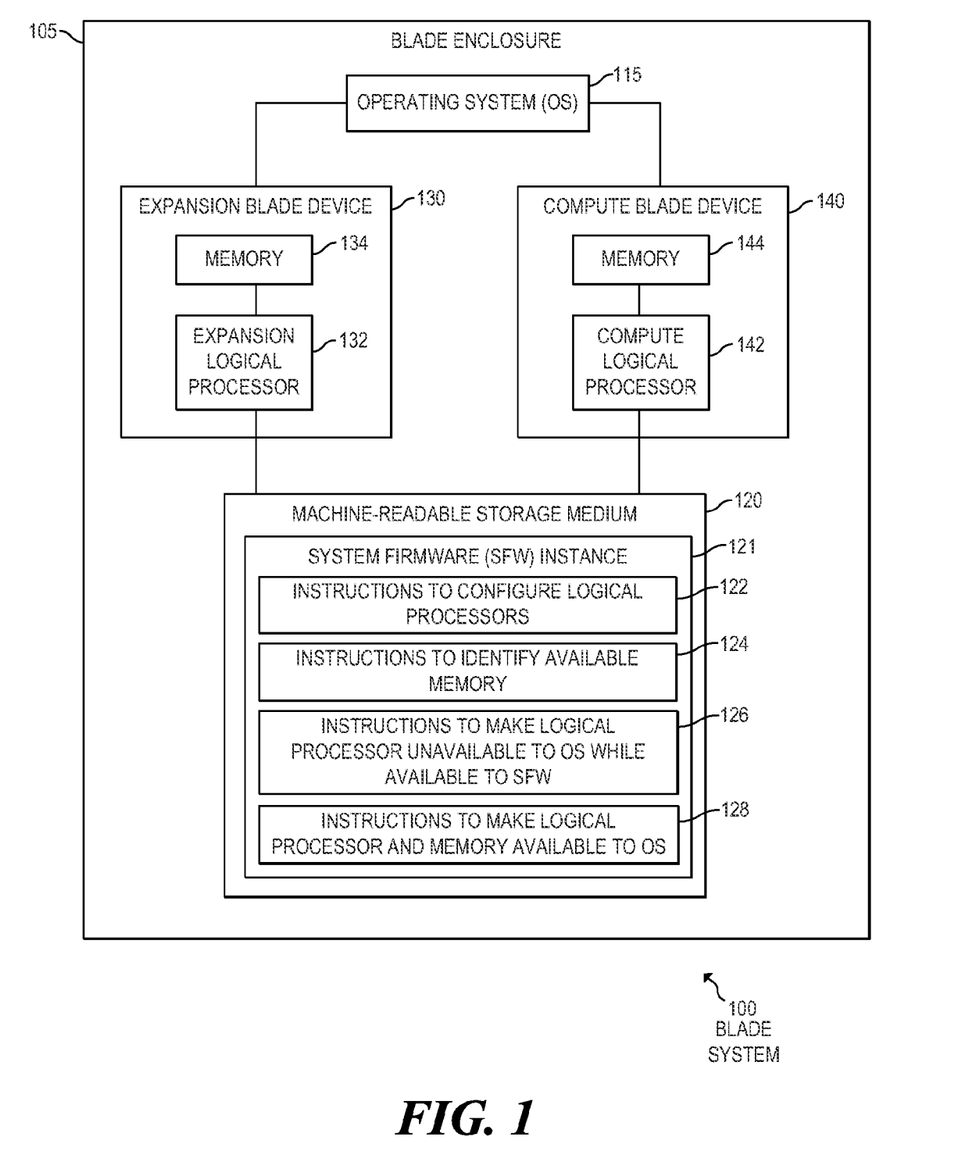
FIG. 1 is a block diagram of an example blade system to make a logical processor unavailable to an operating system (OS) while remaining available to execute instructions of a system firmware (SFW) instance.

Referring now to the drawings, FIG. 1 is a block diagram of an example blade system 100 to make a logical processor unavailable to an operating system (OS) while remaining available to execute instructions of a system firmware (SFW) instance. In examples described herein, a blade system may be a computing system comprising a blade enclosure and at least one blade device mounted in the blade enclosure. In the example of FIG. 1, blade system 100 comprises a blade enclosure 105, and expansion and compute blade devices 130 and 140 each mounted in blade enclosure 105. Blade system 100 may run an OS 115 with resources of each of expansion and compute blade devices 130 and 140. For example, OS 115 may be run by a partition of blade system 100 including at least expansion and compute blade devices 130 and 140.

As used herein, a "blade device" may be a physical computing device that comprises memory and at least one logical processor, and that is mountable to a blade enclosure. In some examples, a blade device may be a modular computing device that is physically mountable to a blade enclosure for operation, that includes certain core computing resources (e.g., logical processor(s) and memory), and that excludes certain peripheral computing resource(s) (e.g., a power supply, cooling fan(s), external networking ports, and the like, or a combination thereof).

As used herein, a "blade enclosure" may be a chassis to receive a plurality of blade devices and provide at least one peripheral resource for the received blade devices. For example, a blade enclosure may include fan(s) to cool mounted blade devices, at least one power supply to provide power to mounted blade devices, external network ports for mounted blade devices, and the like, or a combination thereof.

In the example of FIG. 1, expansion blade device 130 may include an expansion logical processor 132 and memory 134 associated with expansion logical processor 132. In some examples, blade device 130 may include a plurality of logical processors, some or all of which having associated memory. Compute blade device 140 may include a compute logical processor 142 and memory 144 associated with compute logical processor 142. In some examples, blade device 140 may include a plurality of logical processors, some or all of which having associated memory. As used herein, a "logical processor" may be a CPU IC, a CPU of a CPU IC (e.g., one of a plurality of cores on a multi-core CPU IC), or a thread on a CPU (or core) of a CPU IC.

Any expansion blade device or compute blade device described herein may be a blade device as described above. In examples described herein, an expansion blade device may be a blade device designated to provide memory, but not logical processor(s), for use by an OS of a partition including the blade device. In examples described herein, a compute blade device may be a blade device designated to provide memory and logical processor(s) for use by an OS of a partition including the blade device. In some examples, each blade device of a partition may be designated as an expansion or compute blade device in partition information describing aspects of the configuration of the partition. Additionally, any expansion logical processor or compute logical processor described herein may be a logical processor as described above. In examples described herein, an expansion logical processor may be a logical processor of an expansion blade device and a compute logical processor may be a logical processor of a compute blade device.

As used herein, memory 'associated with' a logical processor (or "associated" memory of a logical processor) is memory managed by a memory controller integrated on the CPU IC including or constituting the logical processor. For example, a blade device including memory associated with a logical processor may comprise at least one memory module and a CPU IC including at least one logical processor (e.g., CPU or core) and at least one integrated memory controller to manage the memory module(s). In some examples, a blade device may include a plurality of CPU ICs, each including at least one integrated memory controller to manage memory module(s) of the blade device. As used herein, a memory module may be, for example, a dual in-line memory module (DIMM), a single in-line memory module (SIMM), or any other type of memory module including a plurality of memory devices.

In the example of FIG. 1, blade system 100 includes a machine-readable storage medium 120 encoded with a system firmware (SFW) instance 121 including instructions 122, 124, 126, and 128. In some examples, SFW instance 121 may include additional instructions. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), read-only memory (ROM), volatile memory, non-volatile memory, flash memory, a storage drive (e.g., a hard drive), a solid state drive, any type of storage disc (e.g., a Compact Disc Read Only Memory (CD-ROM), any other type of compact disc, a DVD, etc.), and the like, or a combination thereof. Further, any machine-readable storage medium described herein may be non-transitory. Any "memory" described herein may be at least a portion of at least one machine-readable storage medium.

In the example of FIG. 1, storage medium 120 may be a ROM storing SFW instance 121. In some examples, storage medium 120 may be included on expansion blade device 130 or compute blade device 140. In other examples, storage medium 120 may be included on another blade device mounted to blade device enclosure 105. As used herein, a "system firmware instance" (or "SFW instance") may be a set of machine executable instructions to boot and manage resources of a blade device. For example, after a reset, a logical processor of a blade device may begin to execute instructions of a SFW instance to initialize the logical processor for operation, and to initialize other resource(s) of the blade device, such as the memory associated with the logical processor. In some examples, this initialization of the logical processor and the associated memory may include a power-on self-test (POST) implemented by the SFW instance.

Instructions of a SFW Instance, when executed by the logical processor, may also configure the logical processor to operate in a SFW domain associated with the SFW instance. As used herein, a "system firmware domain" (or "SFW domain") associated with a SFW instance may be an environment in which a logical processor booted by the SFW instance may operate when executing instructions of the SFW instance after booting. In some examples, a SFW domain may include a plurality of SFW resources, including, for example, SFW data structure(s) and SFW code (i.e., machine executable instructions). As used herein, a logical processor operating as part of a SFW domain may be a logical processor having access to the SFW resources of the SFW domain. In some examples, the SFW resources (e.g., the SFW data structure(s) and SFW code) of the SFW domain may be stored in a system management memory region (e.g., SMRAM) for the SFW domain. In such examples, a logical processor operating as part of a SFW domain may be a logical processor having access to the SFW resources stored in the system management memory region for the SFW domain. A logical processor operating as part of a SFW domain may not have access to the SFW resources in the system management memory region at all times. Rather, the logical processor may have access at certain times (e.g., while booting), in certain mode(s) (e.g., a system management mode (SMM)), etc. In examples described herein, a logical processor having such limited access may still be considered to have access to the SFW resources in the system management memory region. In some examples, the system management memory region may be at least a portion of a machine-readable storage medium of at least one blade device mounted in a blade enclosure including the logical processor.

The SFW data structures may include, for example, advanced configuration and power interface (ACPI) table(s), system management BIOS (SMBIOS) table(s), memory data structures, interrupt vector(s), semaphores, and the like, or a combination thereof. The SFW data structure(s) may be generated and stored in the system management memory region by logical processor(s) executing instructions of the SFW instance. The SFW code may include executable instructions implementing interrupt service routines, such as system management interrupt (SMI) handler(s), or the like. The SFW code may also include executable instructions implementing error handler(s). The SFW code may be instructions of the SFW instance copied into the system management memory region.

In the example of FIG. 1, instructions of SFW instance 121 are executable by blade system 100. For example, expansion logical processor 132 and compute logical processor 142 of blade system 100 may fetch, decode, and execute instructions of SFW instance 121 to perform the functionalities described below in relation to SFW instance 121. In the example of FIG. 1, when executed by logical processors 132 and 142 after a reset of at least a portion of blade system 100 (e.g., the partition to run OS 115), instructions 122 may configure compute logical processor 142 of compute blade device 140 and expansion logical processor 132 of expansion blade device 130 to operate as part of a single SFW domain associated with SFW instance 121. In examples described herein, logical processors configured to operate as part of a single SFW domain (i.e., the same SFW domain) may be logical processors that are each configured to access the SFW resources of the SFW domain. For example, the logical processors may each have access (e.g., in SMM) to the system management memory region storing the SFW resources for the SFW domain.

In some examples, logical processors may be configured to operate as part of the same SFW domain by booting each of the logical processors with the same SFW instance 121. In the example of FIG. 1, expansion and compute logical processors 132 and 142 may be configured to operate as part of a SFW domain associated with SFW instance 121 (i.e., the same SFW domain) by booting each of expansion and compute logical processors 132 and 142 with SFW instance 121. In such examples, expansion and compute logical processors 132 and 142 may each boot by executing instructions of SFW instance 121, including instructions 122 to configure the logical processors to operate as part of the SFW domain associated with SFW instance 121.

For example, when executed by expansion and compute logical processors 132 and 142, instructions 122 may configure the respective hardware address maps of expansion and compute logical processors 132 and 142 to be the same. For example, instructions 122 may configure the respective hardware address maps such that expansion and compute logical processors 132 and 142 each have access to the same SFW resources in the system management memory region. For example, instructions 122 may configure the hardware address maps such that logical processors 132 and 142 access the same SFW code (e.g., SMI handler(s), etc.) in the system management memory region. Instructions 122 may also configure logical processors 132 and 142 to access the same state information for the SFW domain associated with SFW instance 121, including, for example, information regarding pending interrupts, loaded drivers, loaded ACPI tables, and the like, or a combination thereof.

As noted above, OS 115 may be run by a partition of blade system 100 including at least expansion and compute blade devices 130 and 140. In such examples, the partition may run OS 115 with resources of each of expansion and compute blade devices 130 and 140. In the example of FIG. 1, when executed by logical processors 132 and 142, instructions 124 may identify available memory of compute blade device 140 associated with compute logical processor 142 and identify available memory of expansion blade device 130 associated with expansion logical processor 132. In some examples, the memory identified by instructions 124 may be memory determined to be available for use by an OS of blade system 100, such as OS 115.

In some examples, compute logical processor 142 may execute instructions 124 to identify available memory among memory 144 associated with compute logical processor 142. For example, compute logical processor 142 may execute instructions 124 as part of its boot process. In such examples, instructions 124 may determine the amount of memory 144 associated with logical processor 142 and then test memory 144 to determine what portion of memory 144 is useable (i.e., functional). In some examples, instructions 124 may identify at least a portion of the memory 144 determined to be useable as memory available for use by OS 115 (i.e., available memory). For example, compute logical processor 142 may reserve a portion of useable memory 144 for use by the compute logical processor 142 (e.g., when executing instructions of SFW instance 121), and identify the remainder of useable memory 144 as available for use by OS 115.

Compute logical processor 142 executing instructions 124 may also store a description of the identified available memory in a service memory of blade device 140. In such examples, a service processor of blade device 140, when executing instructions of an instance of management firmware, may access the description and provide it to a monarch logical processor (e.g., a bootstrap logical processor) in charge of coordinating the booting of the partition to run OS 115. Expansion logical processor 132 may also execute instructions 124 to identify memory available for use by OS 115 (i.e., available memory) among memory 134 associated with expansion logical processor 132, as described above in relation to compute logical processor 142. Expansion logical processor 132 executing instructions 124 may also store a description of the identified available memory in a service memory of blade device 130 such that a service processor of blade device 130, when executing instructions of an instance of management firmware, may provide the description to the monarch logical processor. The descriptions of the identified available memory may be in any suitable data structure or format (e.g., a table, etc.).

In some examples, expansion logical processor 132, executing instructions of SFW instance 121, may access partition information describing at least some aspects of the configuration of the partition to which expansion blade device 130 belongs. For example, the partition information may indicate whether blade device 130 is designated as an expansion or compute blade device for the partition. For example, the partition information may include a flag indicating whether blade device 130 is designated as an expansion or compute blade device. The partition information may be stored in the system management memory region or in service memory of expansion blade device 130 as described above, for example. Expansion logical processor 132 may access the partition information after identifying available memory of memory 134, and before the control of the partition is handed over to OS 115, for example.

In response to determining that blade device 130 is an expansion blade device, expansion logical processor 132 may execute instructions 126 to make expansion logical processor 132 unavailable to OS 115 such that expansion logical processor 132 remains available to execute instructions of SFW instance 121. For example, instructions 126, when executed by expansion logical processor 132, may cause expansion logical processor 132 to enter a system management mode (SMM) and remain in the SMM while OS 115 is executed by at least compute logical processor 142. In such examples, instructions 126 may place expansion logical processor 132 in SMM when executed by logical processor 132, and may cause expansion logical processor 132 to remain in SMM while the OS is executed by other logical processor(s) of the partition (i.e., compute logical processors of the partition).

In examples described herein, a system management mode (SMM) may be a mode in which a logical processor executes SFW code of a SFW domain in which the logical processor is configured to operate. In SMM, expansion logical processor 132 may have access to the system management memory region (e.g., SMRAM) of the SFW domain associated with SFW instance 121, and may execute SFW code (e.g., instructions of SFW instance 121) stored in the system management memory region. In SMM, expansion logical processor 132 is not available to be utilized by OS 115 to run any portion of OS 115 or any portion of an application run in OS 115, for example.

Further, in SMM, expansion logical processor 132 remains available to execute instructions of SFW instance 121, such as instructions of an SMI handler in response to detection of an SMI and instructions of an error handler in response to an error indication, for example. In such examples, the instructions of the SMI handler and the error handler may be instructions of SFW instance 121 and may have been copied into the system management memory region during the boot process. In such examples, in SMM, expansion logical processor 132 may execute these instructions out of the system management memory region.

In other examples, instructions 126 may make expansion logical processor 132 unavailable to OS 115 such that it remains available to execute instructions of SFW instance 121 in any other suitable manner. For example, instructions 126 may cause expansion logical processor 132 to execute a loop implemented by instructions of SFW instance 121 such that expansion logical processor 132 remains executing instructions of SFW instance 121 and is available to be taken out of the loop to execute other SFW code, such as an SMI or error handler, as described above.

In the example of FIG. 1, instructions 128 may make available, for use by OS 115, compute logical processor 142, the identified memory of the compute blade device, and the identified memory of the expansion blade device. For example, compute logical processor 142 may be the monarch logical processor for the partition. In such examples, when executed by compute logical processor 142, instructions 128 may make the compute logical processor 142, the identified memory of the compute blade device, and the identified memory of the expansion blade device available for use by OS 115 by providing information identifying these resources to OS 115.

The information identifying these resources may be provided to OS 115 in any suitable format or data structure (e.g., table(s), etc.). For example, instructions 128 may provide this information to OS 115 in at least one ACPI table. In some examples, instructions 128 may construct the ACPI table(s) based in part on the respective descriptions of the identified available memory of memory 134 and of the identified available memory of memory 144. In such examples, descriptions of memory associated with logical processors of other blade devices may also be provided to the monarch logical processor via service memory and service processor(s), as described above. Additionally, instructions 128 may exclude any identification of expansion logical processor 132 from the ACPI table(s), such that expansion logical processor 132 is not identified as available for OS 115 to utilize.

After compute logical processor 142 and the identified memory of the compute and expansion blade devices are made available to OS 115, OS 115 may run on the partition utilizing the resources identified to OS 115 by instructions 128. For example, OS 115 may execute and run application(s) using compute logical processor 142 and the identified available memory of memory 134 and 144 while expansion logical processor 132 is unavailable for use by OS 115 or any application(s) run by OS 115. In some examples, functionalities described herein in relation to FIG. 1 may be provided in combination with functionalities described herein in relation to any of FIGS. 2-5.

Figure 2:
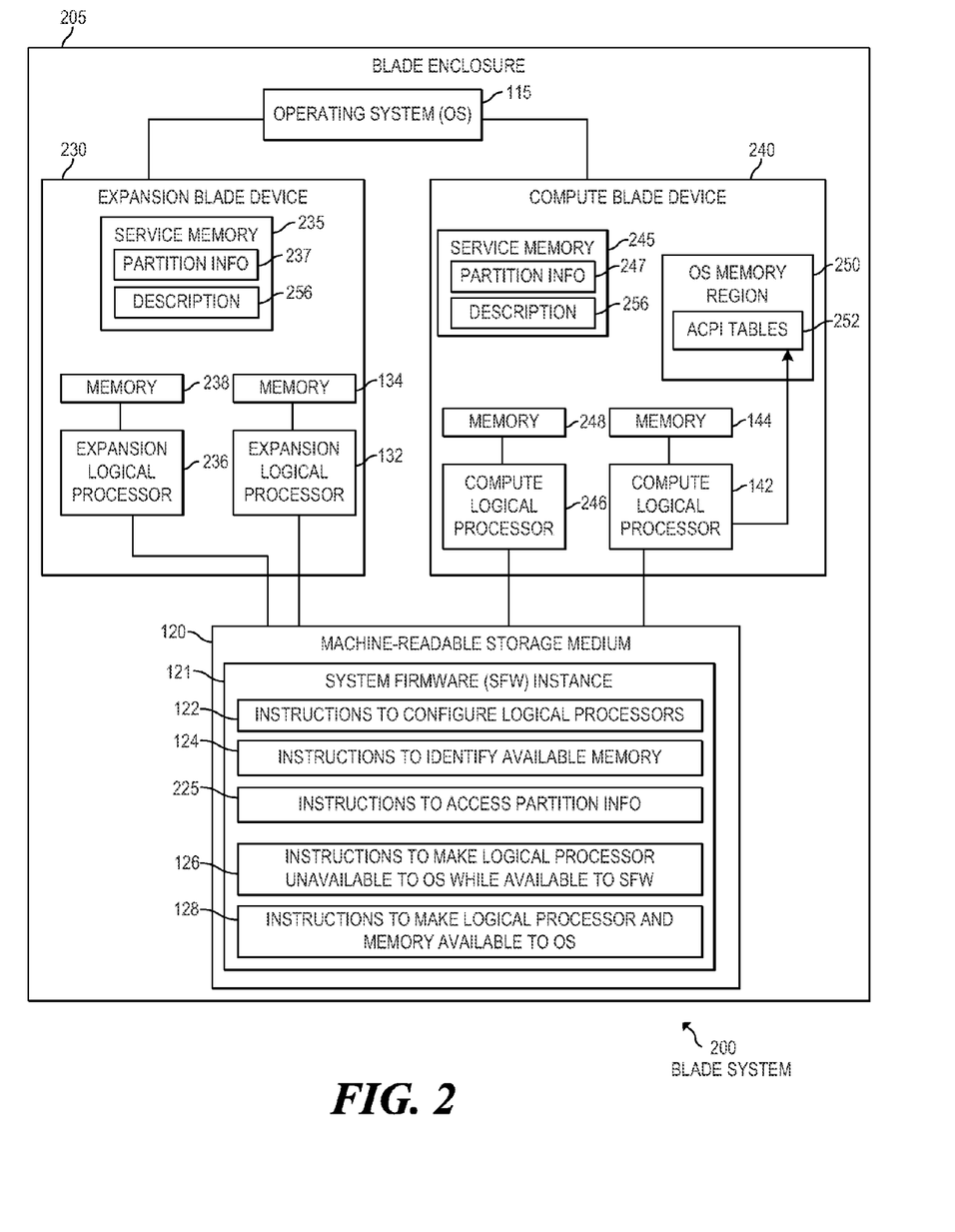
FIG. 2 is a block diagram of an example blade system to make a plurality of logical processors unavailable to an OS while remaining available to execute instructions of a SFW instance.

FIG. 2 is a block diagram of an example blade system 200 to make a plurality of logical processors unavailable to an OS while remaining available to execute instructions of a SFW instance. In the example of FIG. 2, blade system 200 comprises a blade enclosure 205, and blade devices 230 and 240 mounted in blade enclosure 205. Blade device 230 may be referred to herein as an expansion blade device 230, and blade device 240 may be referred to herein as a compute blade device 240. Blade system 200 may run an OS 115, as described above in relation to FIG. 1, with resources of each of blade devices 230 and 240. For example, OS 115 may be run by a partition of blade system 200 including at least blade devices 230 and 240.

In the example of FIG. 2, expansion blade device 230 may include an expansion logical processor 132 and memory 134 associated with expansion logical processor 132, as described above in relation to FIG. 1. Expansion blade device 230 may also include an expansion logical processor 236 associated with memory 238 of blade device 230. In other examples, blade device 230 may include more than two logical processors, some or all of which having associated memory. Compute blade device 240 may include a compute logical processor 142 and memory 144 associated with compute logical processor 142, as described above in relation to FIG. 1. Compute blade device 240 may also include a compute logical processor 246 associated with memory 248 of blade device 240. In other examples, blade device 240 may include more than two logical processors, some or all of which having associated memory.

Blade system 200 also includes a machine-readable storage medium 120 encoded with SFW instance 121 including instructions 122, 124, 126, and 128, as described above in relation to FIG. 1. In the example of FIG. 2, SFW instance 121 may further include at least instructions 225. In some examples, SFW instance 121 may include additional instructions. Instructions of SFW instance 121 are executable by blade system 200. Instructions of SFW instance 121 may be executable by logical processors 132, 236, 142, and 246 to perform the functionalities described below in relation to SFW instance 121.

In the example of FIG. 2, after a reset of at least a portion of blade system 200 (e.g., the partition to run OS 115), instructions 122 may configure each of compute logical processors 142 and 246 of compute blade device 240 and expansion logical processors 132 and 236 of expansion blade device 230 to operate as part of a single SFW domain associated with SFW instance 121, as described in relation to blade system 100 of FIG. 1. For example, each of logical processors 132, 236, 142, 246 may be configured to operate as part of a SFW domain associated with SFW instance 121 (i.e., as part of the sane SFW domain) by booting each of logical processors 132, 236, 142, 246 with SFW instance 121.

In the example of FIG. 2, instructions 124 may, for each logical processor of the first and second pluralities of logical processors, identify available memory associated with the logical processor, as described above in relation to FIG. 1. For example, when executing instructions 124, expansion logical processors 132 and 236 may identify available memory of memory 134 and 238, and compute logical processors 142 and 246 may identify available memory of memory 144 and 248. Additionally, when executing instructions 124, logical processors 132 and 236 may store description(s) 256 of the identified available memory in a service memory 235 of blade device 230. Description(s) 256 may be a single description of the memory identified by each of logical processors 132 and 236, or separate descriptions of the memory identified memory by each logical processor. A service processor of blade device 230 executing management firmware instructions may provide description(s) 256 to blade device 240, in examples in which blade device 240 includes the monarch logical processor (e.g., logical processor 142) for a partition of blade system 200 including blade devices 230 and 240. In such examples, the service processor of blade device 230 may provide description(s) 256 to a service processor of blade device 240, which may store the received description(s) 256 in a service memory 245 of blade device 240 where description(s) 256 are accessible to the monarch logical processor (e.g., logical processor 142). In such examples, logical processors on the same blade device as the monarch logical processor may communicate description(s) of identified memory to the monarch logical processor in any suitable manner. In other examples, the logical processors of the first and second pluralities, when executing instructions 124, may store descriptions of identified available memory in a shared memory region for the partition. In such examples, the shared memory region may be implemented by memory of one blade device or memory regions of each of a plurality of blade devices of the partition. In examples described herein, a service processor may be at least one of a CPU, a semiconductor-based microprocessor, other electronic circuitry suitable for the retrieval and execution instructions stored on a machine-readable storage medium, or a combination thereof As noted above, OS 115 may be run by a partition of blade system 200 including at least blade devices 230 and 240. In such examples, the partition may run OS 115 with resources of each of blade devices 230 and 240. In such examples, blade system 200 may store partition information describing aspects of the configuration of the partition. In the example of FIG. 2, before control of the partition is handed over to OS 115, instructions 225 may access partition information 237 designating blade device 230 as an expansion blade device. In some examples, blade device 230 may comprise a first plurality of logical processors of blade system 200 including, for example, logical processors 132 and 236. Instructions 225 may also access partition information 247 designating blade device 240 as a compute blade device. In some examples, blade device 240 may comprise a second plurality of logical processors of blade system 200 including, for example, logical processors 142 and 246.

In some examples, partition information 237 may be a portion of the partition information for the partition, and may include configuration information relevant to blade device 230. Blade device 230 may access the partition information for the partition with a service processor of blade device 230 and store partition information 237 in service memory 235 of blade device 230. In some examples, partition information 247 may be a portion of the partition information for the partition, and may include configuration information relevant to blade device 240. Compute blade device 240 may access the partition information for the partition with a service processor of blade device 240 and store partition information 247 in service memory 245 of blade device 240. In such examples, each of expansion logical processors 132 and 236, executing instructions 225, may access partition information 237 and determine, based on partition information 237, that blade device 230 is designated as an expansion blade device (i.e., designated as a blade device to provide memory for use by the OS and to provide no logical processors for use by the OS). Additionally, each of compute logical processors 142 and 246, executing instructions 225, may access partition information 247 and determine, based on partition information 247, that blade device 240 is designated as a compute blade device (i.e., designated as a blade device to provide memory and at least one logical processor for use by the OS).

After determining that blade device 230 comprising the first plurality of logical processors (i.e., logical processors 132 and 236) is designated as an expansion blade device, instructions 126 may make each of the first plurality of logical processors unavailable to the OS such that they each remain available to execute instructions of the SFW instance, as described above in relation to FIG. 1. For example, each of logical processors 132 and 236 may execute instructions 126 to enter and remain in SMM while OS 115 is executed by the partition.

In other examples, one of the logical processors of blade device 230 designated as an expansion blade device may be made unavailable to OS 115 such that it remains available to execute instructions of SFW instance 121, while the other logical processors of blade device 230 may be made unavailable to the OS such that they do not remain available to execute instructions of SFW instance 121. For example, the rest of the logical processors of blade device 230 may be placed in a halt state, an initialization state (e.g., waiting for startup inter-processor interrupt (SIPI)), or the like. In such examples, the one logical processor remaining available to execute instructions of SFW instance 121 may be used for management of the blade device. In examples including a plurality of expansion blade devices, one logical processor of each expansion blade device may remain available to execute instructions of SFW instance 121, for example.

In the example of FIG. 2, instructions 128 may make available, for use by OS 115, each of the second plurality of logical processors, the identified memory associated with each logical processor of the first plurality, and the identified memory associated with each logical processor of the second plurality of logical processors. Instructions 128 may make these resources available for use by OS 115 as described above in relation to FIG. 1. For example, instructions 128 may generate at least one ACPI table 252 to be provided to OS 115.

In some examples, compute logical processor 142 may be the monarch logical processor for the partition to run OS 115. In such examples, when executed by compute logical processor 142, instructions 128 may indicate, in at least one of ACPI table(s) 252, that compute logical processors 132 and 142 are available for use by OS 115. Instructions 128 may also indicate, at least one of ACPI table(s) 252, that the identified memory of compute blade device 240 and the identified memory of expansion blade device 230 are available for use by OS 115. The identified memory of compute blade device 240 may include the identified available memory of memory 144 and 248 of blade device 240, and the identified memory of expansion blade device 230 may include the identified available memory of memory 134 and 238 of blade device 230.

Instructions 128 may further store the ACPI table(s) in a memory region 250 accessible to OS 115 so that OS 115 may utilize the resources identified in the ACPI table(s). In such examples, each of the ACPI table(s) may exclude any information regarding expansion logical processors 132 and 236 (e.g., each of the logical processors of the first plurality). In this manner, OS 115 is not made aware of expansion logical processors 132 and 236. In some examples, instructions 128 may further provide, in the ACPI table(s) 252, proximity domain information for the identified memory of expansion blade device 230. In such examples, the proximity domain information may indicate functional distance(s) from the compute logical processors of blade device 240 to the identified memory of expansion blade device 230, In some examples, functionalities described herein in relation to FIG. 2 may be provided in combination with functionalities described herein in relation to any of FIGS. 1 and 3-5.

Figure 3:
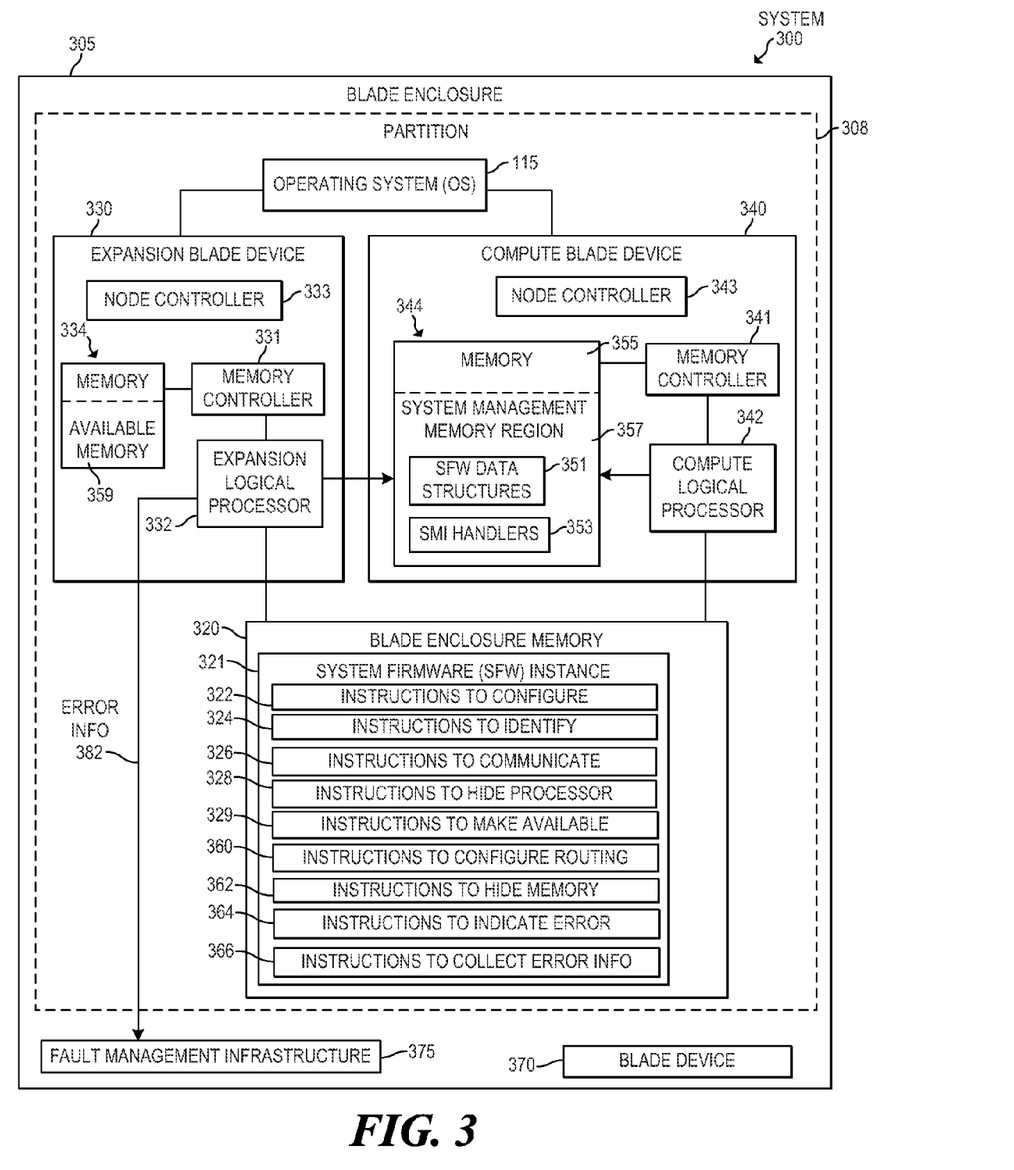
FIG. 3 is a block diagram of an example system to make available, to an OS of a partition of the system, memory of compute and expansion blade devices.

FIG. 3 is a block diagram of an example system 300 to make available, to an OS of a partition of system 300, memory of compute and expansion blade devices. In the example of FIG. 3, system 300 (e.g., blade system 300) comprises a blade enclosure 305, and blade devices 330, 340, and 370 mounted in blade enclosure 305. In other examples, system 300 may include more or fewer blade devices mounted in blade enclosure 305. Blade device 330 may be referred to herein as an expansion blade device 330, and blade device 340 may be referred to herein as a compute blade device 340.

In the example of FIG. 3, expansion blade device 330 comprises a logical processor 332, memory 334 associated with logical processor 332, a memory controller 331 to manage memory 334, and a node controller 333. Logical processor 332 may be referred to herein as an expansion logical processor 332. Memory controller 331 and expansion logical processor 332 may be integrated into a single CPU IC. For example, memory controller 331 may be integrated in a CPU IC comprising or constituting logical processor 332. In some examples, the CPU IC including logical processor 332 and memory controller 331 may also include additional memory controller(s) to manage other memory of blade device 330. In some examples, blade device 330 may include a plurality of logical processors, some or all of which having associated memory.

Compute blade device 340 comprises a logical processor 342, memory 344 associated with logical processor 342, a memory controller 341 to manage memory 344, and a node controller 343. Logical processor 342 may be referred to herein as a compute logical processor 342. Memory controller 341 and compute logical processor 342 may be integrated into a single CPU IC. For example, memory controller 341 may be integrated in a CPU IC comprising or constituting logical processor 342. In some examples, the CPU IC including logical processor 342 and memory controller 341 may also include additional memory controller(s) to manage other memory of blade device 340. In some examples, blade device 340 may include a plurality of logical processors, some or all of which having associated memory. The functionalities of each of memory controllers 331 and 341 and node controllers 333 and 343 may be implemented in the form of electronic circuitry, in the form of executable instructions encoded on a machine-readable storage medium, or a combination thereof.

Blade system 300 may run an OS 115, as described above in relation to FIG. 1, with resources of each of blade devices 330 and 340. For example, OS 115 may be run by a partition 308 of blade system 300 including at least blade devices 330 and 340. In the example of FIG. 3, partition 308 may omit at least one blade device of system 300, such as blade device 370, for example. In other examples, partition 308 may include additional blade devices mounted in blade enclosure 305.

In the example of FIG. 3, blade system 300 includes blade enclosure memory 320 encoded with a SFW instance 321 including instructions 322, 324, 326, 328, 329, 360, 362, 364, and 366. In some examples, SFW instance 321 may include additional instructions, instructions of SFW instance 321 are executable by blade system 300. For example, instructions of SFW instance 321 may be executable by logical processors of partition 308 (e.g., logical processors 332 and 342) to perform the functionalities described below in relation to SFW instance 321. In the example of FIG. 3, SFW instance 321 is executable to boot partition 308 to execute OS 115.

In some examples, instructions of SFW instance 321 may be stored on a single machine-readable storage medium (e.g., a flash device) of a single blade device. In such examples, blade enclosure memory 320 may be memory of a single blade device. In other examples, each blade device of partition 308 may include a respective machine-readable storage medium storing a copy of at least a portion of SFW instance 321. In such examples, blade enclosure memory 320 may comprise each of the respective memories storing a copy of a portion SFW instance 321. In such examples, each logical processor of each blade device may at least begin booting from a local copy of a portion of SFW instance 321. In such examples, the logical processors may subsequently converge to continue booting from a shared portion of SFW instance 321 stored in a shared memory region.

In the example of FIG. 3, SFW instance 321 is executable by each logical processor of partition 308 to boot the logical processors after a reset. For example, after a reset of at least partition 308, instructions 322, when executed by expansion and compute logical processors 332 and 342, may configure expansion and compute logical processors 332 and 342 to operate as part of a single SFW domain associated with SFW instance 321, as described above in relation to FIG. 1. In some examples, when executed by logical processors 332 and 342, instructions 322 may configure expansion and compute logical processors 332 and 342 each to have access to a system management memory region 357 of partition 308 when in SMM. For example, instructions 322 may configure the respective hardware address maps of logical processors 332 and 342 such that logical processors 332 and 342 have access to system management memory region 357 (e.g. SMRAM) of the SFW domain associated with SFW instance 321, at least when in SMM. In such examples, logical processors 332 and 342 may have limited access to system management memory region 357, as described above in relation to FIG. 1 (e.g., access when in SMM). In some examples, system management memory region 357 may be a portion of memory 344. In other examples, system management memory region 357 may be a region implemented by any memory of any blade device of partition 308.

In the example of FIG. 3, the SFW domain associated with SFW instance 321 may comprise a plurality of SFW resources, as described above in relation to FIG. 1. In such examples, the SFW resources may include SFW data structure(s) 351 and SFW code stored in system management memory region 357, as described above in relation to FIG. 1, in the example of FIG. 3, the SFW code may include SMI handler(s) 353 stored in system management memory region 357. When executed by expansion and compute logical processors 332 and 342, instructions 322 may configure expansion and compute logical processors 332 and 342 each to have access, in SMM, to SFW data structure(s) 351 and SMI handler(s) 353 stored in system management memory region 357.

Instructions 324, when executed by expansion logical processor 332, may identify available memory 359 of expansion blade device 330 that is associated with expansion logical processor 332, as described above in relation to instructions 124 of FIG. 1. Available memory 359 may be a portion of memory 334. In addition, when executed by compute logical processor 342, instructions 324 may identify available memory 355 of compute blade device 340 that is associated with compute logical processor 342, as described above in relation to instructions 124 of FIG. 1. Available memory 355 may be a portion of memory 344 that does not include system management memory region 357, which may have been reserved by compute logical processor 342.

In the example of FIG. 3, when executed by expansion logical processor 332, instructions 326 may communicate, to compute logical processor 342, a description of the identified memory 359 of expansion blade device 330. In such examples, compute logical processor 342 may be a monarch logical processor to coordinate the booting of partition 308, and instructions 326 may communicate the description by storing the description in a service memory of blade device 330 or in a shared memory region of partition 308 accessible to compute logical processor 342, as described above.

When executed by compute logical processor 342, instructions 360 may configure compute blade device 340 to route memory transactions targeting the identified memory 359 of expansion blade device 330 through node controllers 333 and 343. For example, instructions 360 may set routing table(s) in compute logical processor 342 to route memory transactions targeting the identified memory 359 through node controller 343, and may set routing table(s) in node controller 343 to route memory transactions targeting the identified memory 359 through node controller 333 of blade device 330. In some examples, when executed by expansion logical processor 332, instructions 360 may configure routing table(s) in node controller 333 such that node controller 333 may route, to identified memory 359, memory transactions targeting that memory (e.g., via memory controller 331).

After storing the description of identified memory 359, as described above, expansion logical processor 332 may execute instructions 362 to hide the identified memory 359 of expansion blade device 330 from expansion logical processor 332. For example, when executed by logical processor 332, instructions 362 may set source address decoders of logical processor 332 such that it is not able to access any of identified memory 359. In such examples, instructions 362 may set the source address decoders of logical processor 332 such that they contain no address translations for any address among the identified memory 359 of memory 334. In this manner, instructions 362 may firewall, from expansion logical processor 332, the identified memory 359 available for use by OS 115. In such examples, expansion logical processor 332 may be made unavailable for use by OS 115 (as described below), and the identified memory 359 made available for use by OS 115 may be made unavailable for use by expansion logical processor 332. In some examples, instructions 360 may receive an indication of a select portion of identified memory 359 that will be made available to OS 115 and may hide the select portion from logical processor 332 and not the remaining portions.

In the example of FIG. 3, expansion logical processor 332 may execute instructions 328 to hide expansion logical processor 332 from OS 115 such that the expansion logical processor is unavailable for use by OS 115 while remaining available to execute instructions of SFW instance 321. In such examples, logical processor 332 may access partition information to determine that blade device 330 (i.e., the blade device comprising logical processor 332) is designated as an expansion blade device, and in response execute instructions 328 to make itself unavailable for use by OS 115 while remaining available to execute instructions of SFW instance 321, as described above in relation to FIG. 1. For example, when executed by logical processor 332, instructions 328 may cause expansion logical processor 332 to enter SMM and remain in SMM while OS 115 is executed by partition 308, including at least compute logical processor 342. Expansion logical processor 332 may enter and remain in SMM while OS 115 is executed, as described above in relation to FIG. 1. In some examples, instructions 328 may hide expansion logical processor 332 after expansion logical processor 332 performs the functionalities described above in relation to instructions 322, 324, 326, 360, and 362.

In the example of FIG. 3, when executed by compute logical processor 342, instructions 329 may make available, for use by OS 115, compute logical processor 342 and identified memory 359 and 355, as described above in relation to FIGS. 1 and 2. For example, instructions 328 may store, in a region of memory accessible to OS 115, ACPI table(s) including information regarding compute logical processor 342 and identified memory 359 and 355, but excluding any information regarding expansion logical processor 332.

In some examples, logical processors operating in the same SFW domain may be able to communicate with one another. For example, such logical processors may be aware of addresses for one another, and may send communications (e.g., interrupts, etc.) to one another using the addresses. In such examples, logical processors may utilize such communications to coordinate error handling for a partition including the logical processors, for example.

In the example of FIG. 3, after booting OS 115 to run on partition 308 using compute logical processor 342 and identified memory 355 and 359 (and not using expansion logical processor 332), compute logical processor 342 may detect an error, such as a memory error or the like. In response to detection of the error, compute logical processor 342 may execute instructions 364 to provide an interrupt indicating the detected error to expansion logical processor 332. For example, instructions 364 may provide the interrupt to the address of logical processor 332. In some examples, instructions 364 may have been copied into system management memory region 357 when booting partition 308. In such examples, compute logical processor 342 may execute instructions 364 from system management memory region 357 while operating in SMM, in which execution of OS 115 is suspended and logical processor 342 has access to instructions 364.

As described above, expansion logical processor 332 may be in SWIM or otherwise unavailable for use by OS 115 while remaining available to execute instructions of SFW instance 321. In such examples, expansion logical processor 332 may not be available to be interrupted. In some examples, while executing instructions of SFW instance 321, expansion logical processor 332 may poll interrupt sources (e.g., interrupt pending registers, etc.) for indications of interrupts, and may detect the interrupt provided by compute logical processor 342 while performing such polling. For example, expansion logical processor 332 executing instructions of SFW instance 321 may detect the interrupt while polling state information of system management memory region 357, which may indicate that the interrupt is pending. Instructions 366 may be executed by expansion logical processor 332 to collect error information 382 from registers associated with expansion logical processor 332, in response to detecting the interrupt from compute logical processor 342. For example, instructions 366 may collect error information 382 (e.g., error log(s), etc.) from machine status registers (MSRs) of a CPU IC comprising (or constituting) expansion logical processor 332. In some examples, in addition to providing the interrupt, compute logical processor 342 may provide a message specifying certain error correction action(s) for expansion logical processor 332 to take in response to the error, such as collecting error information. For example, compute logical processor 342 may store the message in system management memory region 357, and expansion logical processor 332 may poll system management memory region 357 for such messages. In such examples, instructions 366 executed by expansion logical processor 332 may further provide the collected error information 382 to a fault, management infrastructure (FMI) 375 of blade system 300. The functionalities of FMI 375 may be implemented in the form of electronic circuitry, in the form of executable instructions encoded on a machine-readable storage medium, or a combination thereof. In some examples, instructions 366 may have been copied into system management memory region 357 when booting partition 308, and expansion logical processor 332 may execute instructions 366 out of system management memory region 357 when in SMM. In some examples, expansion logical processor 332 executing instructions of SFW instance 321 may also poll various error sources (e.g., error registers, etc.) to detect errors.

In the example described above, partition 308 may utilize an expansion logical processor unavailable to OS 115 to collect error information for partition 308. For example, compute logical processor 342, when executing OS 115 or an application running in OS 115, may detect a memory error when utilizing available memory 359 of expansion blade device 359. The MSRs of the CPU IC including (or constituting) expansion logical processor 332 may include information useful for management of the error. However, these MSRs may be accessible exclusively by a logical processor (e.g., CPU or core) on the CPU IC, and not to compute logical processor 342, for example. In examples described herein, by keeping expansion logical processor 332 available to execute instructions of SFW instance 321, expansion logical processor 332 may still be available to collect the error information from the MSRs and provide it to FMI 375 for managing the error, as described above, even though expansion logical processor 332 is unavailable to OS 115. In such examples, expansion logical processor 332 may collect and provide the error information when executing instructions of SFW instance 321. As described above, expansion logical processor 332 executing instructions of SFW instance 321 may detect interrupts by polling interrupt sources to detect interrupts. In such examples, expansion logical processor 332 executing instructions of SFW instance 321 may remain unavailable to be interrupted by OS 115 by not polling for any interrupts that may come from OS 115. In this manner, expansion logical processor 332 (and any other expansion logical processor described herein) may ignore interrupts from OS 115. In some examples, functionalities described herein in relation to FIG. 3 may be provided in combination with functionalities described herein in relation to any of FIGS. 1-2 and 4-5.

Figure 4:
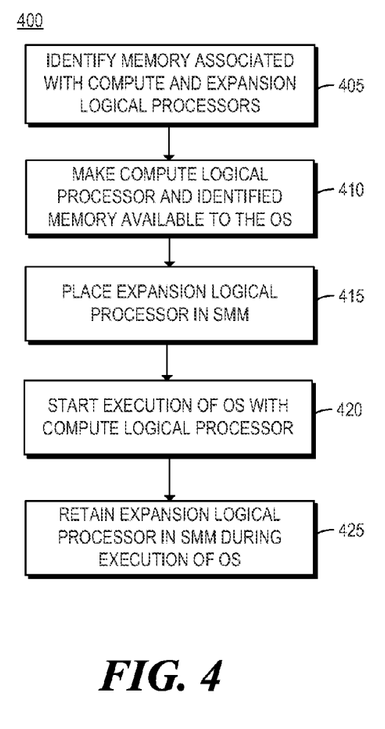
FIG. 4 is a flowchart of an example method for retaining an expansion logical processor in a system management mode (SMM) during execution of an OS with a compute logical processor.

FIG. 4 is a flowchart of an example method 400 for retaining an expansion logical processor in SMM during execution of an OS with a compute logical processor. Although execution of method 400 is described below with reference to blade system 300 of FIG. 3, other suitable systems for execution of method 400 can be utilized (e.g., blade system 100 or 200). Additionally, implementation of method 400 is not limited to such examples.

At 405 of method 400, after a reset of at least partition 308, instructions 324, executed by logical processors 332 and 342, may identify available memory 355 of compute blade device 340 that is associated with compute logical processor 342 and available memory 359 of expansion blade device 330 that is associated with expansion logical processor 332, as described above. At 410, instructions 329, executed by compute logical processor 342, may make available, for use by OS 115, compute logical processor 342, the identified memory 355 of compute blade device 340, and the identified memory 359 of expansion blade device 330, as described above.

At 415, instructions 328, executed by expansion logical processor 332, may place expansion logical processor 332 in SMM prior to the start of execution of OS 115 by partition 308. Instructions 328 may cause expansion logical processor 332 to enter SMM in response to determining that blade device 330 is designated as an expansion blade device, as described above.

At 420, partition 308 may start executing OS 115 with at least compute logical processor 342. For example, partition 308 may boot OS 115 with SFW instance 321, as described above, and then start execution of OS 115 with the resources of partition 308 made available to OS 115 by compute logical processor 342 (e.g., in ACPI table(s) provided to OS 115, as described above). In such examples, partition 308 may execute OS 115 with at least compute logical processor 342 and identified memory 355 and 359, while expansion logical processor 332 is unavailable to OS 115. In some examples, partition 308 may execute OS 115 with additional resources of partition 308 as well, such as other memory of blade devices of partition 308 and other compute logical processors of partition 308.

At 425, instructions 328, executed by expansion logical processor 332, may retain expansion logical processor 332 in SMM during execution of OS 115 such that expansion logical processor 332 is unavailable for use by OS 115. In such examples, by keeping expansion logical processor 332 in SMM, expansion logical processor 332 may remain available to execute instructions of SFW instance 321 while it is unavailable to OS 115. While in SMM, expansion logical processor 332 is also unavailable to be interrupted by OS 115, as described above.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
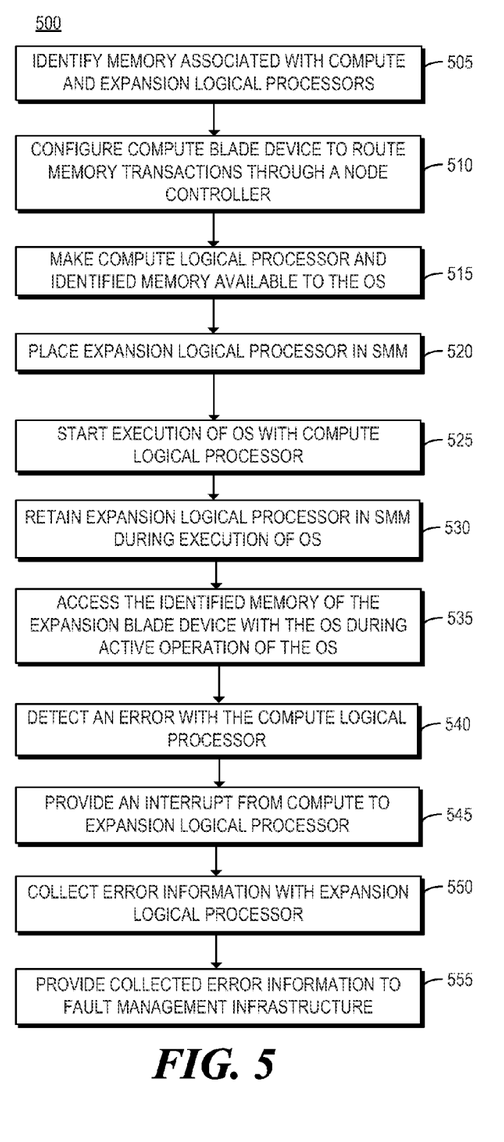
FIG. 5 is a flowchart of an example method for collecting error information with an expansion logical processor in response to an error detected by a compute logical processor.

FIG. 5 is a flowchart of an example method 500 for collecting error information with an expansion logical processor in response to an error detected by a compute logical processor. Although execution of method 500 is described below with reference to blade system 300 of FIG. 3, other suitable systems for execution of method 500 can be utilized (e.g., blade system 100 or 200). Additionally, implementation of method 500 is not limited to such examples.

At 505 of method 500, after a reset of at least partition 308, instructions 324, executed by logical processors 332 and 342, may identify available memory 355 of compute blade device 340 that is associated with compute logical processor 342 and available memory 359 of expansion blade device 330 that is associated with expansion logical processor 332, as described above. At 510, instructions 360 may configure compute blade device 340 to route memory transactions targeting identified memory 359 of expansion blade device 330 through node controller 343 of compute blade device 340, as described above in relation to FIG. 3. In some examples, node controller 343 may be in communication with node controller 333 of expansion blade device 330.

At 515, instructions 329, executed by compute logical processor 342 may make available, for use by OS 115, compute logical processor 342, the identified memory 355 of compute blade device 340, and the identified memory 359 of expansion blade device 330, as described above. At 520, instructions 328, executed by expansion logical processor 332, may place expansion logical processor 332 in a system management mode (SMM) prior to the start of execution of OS 115 by partition 308, as described above.

At 525, partition 308 may start executing OS 115 with at least compute logical processor 342. For example, partition 308 may boot OS 115 with SFW instance 321, as described above, and then start execution of OS 115 with at least the resources of partition 308 made available to OS 115 by compute logical processor 342 (e.g., in ACPI table(s) provided to OS 115, as described above). At 530, instructions 328, executed by expansion logical processor 332, may retain expansion logical processor 332 in SMM during execution of OS 115 such that expansion logical processor 332 is unavailable for use by OS 115 while remaining available to execute instructions of SFW instance 321.

At 535, OS 115 executing on at least compute logical processor 342 may access the identified memory 359 of expansion blade device 330 during active operation of OS 115 via node controller 343. In such examples, OS 115 may access the identified memory 359 without entering SMM or otherwise suspending operation of OS 115 on any of the logical processors executing OS 115. Also, in such examples, compute blade device 340 may route any transaction(s) accessing the identified memory 359 through node controller 343.

At 540, compute logical processor 342 may detect an error. For example, compute logical processor 342 may detect a memory error that occurred when accessing identified memory 359 of blade device 330, as described above. In response to detection of the error, at 545 compute logical processor 342 may provide an interrupt to expansion logical processor 332, as described above. In response to the interrupt, at 550, expansion logical processor 332 may collect error information from registers associated with expansion logical processor 332, such as MSRs of the CPU IC including or constituting expansion logical processor 332. In some examples, expansion logical processor 332 operating in SMM may detect the interrupt while polling for interrupt indications, as described above in relation to FIG. 3. At 555, expansion logical processor 332 may provide collected error information 382 to fault management infrastructure (FMI) 375 of blade system 300.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A non-transitory machine-readable storage medium encoded with a system firmware (SFW) instance comprising instructions executable by a system to:
configure each of a compute logical processor of a compute device and an expansion logical processor of an expansion device to operate as part of a single SFW domain associated with the SFW instance, wherein the system includes the compute and expansion devices mounted in an enclosure, wherein the compute device is a physical computing device and the expansion device is a physical computing device;
identify available memory of the compute device associated with the compute logical processor and available memory of the expansion device associated with the expansion logical processor;
hide the identified memory of the expansion device from the expansion logical processor;
make available, for use by an operating system (OS) of the system, the compute logical processor and the identified memory of the compute device and the identified memory of the expansion device; and
make the expansion logical processor unavailable to the OS such that the expansion logical processor remains available to execute instructions of the SFW instance.

2. The storage medium of claim 1, wherein the instructions to make the expansion logical processor unavailable comprise instructions that, when executed by the expansion logical processor, cause the expansion logical processor to enter a system management mode (SMM) and remain in the SMM while the OS is executed by at least the compute logical processor.

3. The storage medium of claim 1, wherein the instructions to make available comprise instructions to:
indicate, in at least one advanced configuration and power interface (ACPI) table, that the compute logical processor is available for use by the OS;
indicate, in the at least one ACPI table, that the identified memory of the compute device and the identified memory of the expansion device are available for use by the OS; and
store the at least one ACPI table, each excluding any information regarding the expansion logical processor, in a memory region accessible to the OS.

4. The storage medium of claim 3, wherein the instructions to make available comprise instructions to:
provide, in the at least one ACPI table, proximity domain information for the identified memory of the expansion device, the proximity domain information indicating a functional distance from the compute logical processor to the identified memory of the expansion device.

5. The storage medium of claim 1, wherein the SFW instance further comprises instructions executable by the system to:
access first partition information designating the expansion device as a device to provide memory for use by the OS and to provide no logical processors for use by the OS, wherein the expansion device includes a first plurality of logical processors of the system to be unavailable to the OS; and
access second partition information designating the compute as a device to provide memory and at leak one logical processor for use by the OS, wherein the compute device includes a second plurality of logical processors;
wherein the first plurality includes the expansion logical processor and the second plurality includes the compute logical processor.

6. The storage medium of claim 5, wherein:
the instructions to identify comprise instructions to identify, for each logical processor of the first and second pluralities of logical processors, available memory associated with the logical processor;
the instructions to make available comprise instructions to make available, for use by the OS, each of the second plurality of logical processors and the identified memory associated with each logical processor of the first and second pluralities of logical processors; and
the instructions to make the expansion logical processor unavailable to the OS comprise instructions to make each of the first plurality of logical processors unavailable to the OS while each remaining available to execute instructions of the SFW instance.

7. The storage medium of claim 1, wherein the system is a blade system, the enclosure is a blade enclosure, the compute device is a compute blade device, and the expansion device is an expansion blade device.

8. A system comprising:
enclosure memory storing a system firmware (SFW) instance to boot a partition to execute an operating system (OS);
a compute logical processor of a compute device of the partition, wherein the compute device is a physical computing device; and
an expansion logical processor of an expansion device of the partition, wherein the SFW instance comprises instructions executable by the expansion logical processor to:
communicate, to the compute logical processor, a description of identified available memory of the expansion device associated with the expansion logical processor;
hide the expansion logical processor from the OS such that the expansion logical processor is unavailable for use by the OS while remaining available to execute instructions of the SFW instance; and
hide the identified memory of the expansion device from the expansion logical processor, wherein the expansion device is a physical computing device;
wherein the SFW instance comprises instructions executable by the compute logical processor to:
identify available memory of the compute device associated with the compute logical processor; and
make available, for use by the OS, the compute logical processor and the identified memory of each of the compute and expansion devices.

9. The system of claim 8, wherein the SFW instance comprises instructions executable by the expansion and compute logical processors to:
configure the expansion and compute logical processors to have access to a system management memory region in a system management mode (SMM).

10. The system of claim 9, further comprising:
a first node controller of the expansion device; and
a second node controller of the compute device,
wherein the SFW instance comprises instructions executable by the compute logical processor to:
configure the compute device to route memory transactions targeting the identified memory of the expansion device through the first and second node controllers.

11. The system of claim 9, wherein:
the SFW instance comprises instructions executable by the compute logical processor to:
provide an interrupt indicating an error to the expansion logical processor; and
the SFW instance comprises instructions executable by the expansion logical processor to:
in response to the interrupt, collect error information from registers associated with the expansion logical processor; and
provide the collected error information to a fault management infrastructure.

12. The system of claim 9, wherein:
a SFW domain associated with the SFW instance comprises a SFW data structure and a system management interrupt (SMI) handler stored in a system management memory region of the partition; and
the instructions to configure comprise instructions executable by the expansion and compute logical processors to configure the compute logical processor and the expansion logical processor each to have access, in the SMM, to the SFW data structure and the SMI handler stored in the system management memory region.

13. The system of claim 8, wherein the enclosure is a blade enclosure, the compute device is a compute blade device, and the expansion device is an expansion blade device.

14. A method executable by a partition of an enclosure comprising a compute device including a compute logical processor, an expansion device including an expansion logical processor, and enclosure memory storing a system firmware (SFW) instance to boot the partition to execute an operating system (OS), wherein each of the compute device and the expansion device is a respective physical computing device, the method comprising:
identifying available memory of the compute device associated with the compute logical processor and available memory of the expansion device associated with the expansion logical processor, by executing instructions of the SFW instance;
making available, for use by the OS, the compute logical processor and the identified memory of each of the compute and expansion devices;
hiding the identified memory of the expansion device from the expansion logical processor;
placing the expansion logical processor in a system management mode (SMM) prior to a start of execution of the OS;
starting execution of the OS with at least the compute logical processor; and
retaining the expansion logical processor in the SMM during execution of the OS such that the expansion logical processor is unavailable for use by the OS.

15. The method of claim 14, further comprising:
configuring the compute device to route memory transactions targeting the identified memory of the expansion device through a node controller of the compute device in communication with the expansion device; and
accessing, with the OS, the identified memory of the expansion device during active operation of the OS via the node controller.

16. The method of claim 15, further comprising:
detecting an error with the compute logical processor;
in response to detection of the error, providing an interrupt from the compute logical processor to the expansion logical processor;
collecting, with the expansion logical processor, error information from registers associated with the expansion logical processor, in response to the interrupt; and
providing the collected error information to a fault management infrastructure (FMI).

17. The method of claim 14, wherein the enclosure is a blade enclosure, the compute device is a compute blade device, and the expansion device is an expansion blade device.

* * * * *